United States Patent Office 3,234,187
Patented Feb. 8, 1966

3,234,187
SULFUR-CONTAINING POLYMERS AND THEIR
PREPARATION
Stephen Proskow, Claymont, Del., assignor to E. I. du
Pont de Nemours and Company, Wilmington, Del., a
corporation of Delaware
No Drawing. Filed Jan. 11, 1961, Ser. No. 81,923
11 Claims. (Cl. 260—79)

This invention relates to, and has as its principal objects provision of, novel sulfur-containing polymeric compositions and methods for the preparation of the same.

The macromolecular synthetic polymers have gained spectacular commercial success in a relatively short time and this success has stimulated intensive efforts to develop new polymers possessing properties adapted to particular uses. A novel and attractive polymer has now been obtained from simple and readily available reactants. This polymer is a colorless-to-tan solid which melts at ca. 200° C., exhibits broad infra-red absorption bands at ca. 8.84μ, 9.45μ, and 14.0μ, yields self-supporting films, is resistant to degradation by air and by boiling 10% aqueous hydrochloric acid, consists essentially of carbon and sulfur in an atomic ratio of about 1:2, and has a molecular weight in excess of 800.

The new polymer is made by reacting the compound $C_2S_3Cl_2$ with either (1) an alkali metal sulfide, (2) an alkali metal trithiocarbonate or (3) hydrogen sulfide in the presence of a hydrogen chloride acceptor.

Although the $C_2S_3Cl_2$ used as a starting material in the immediate process has been described in the literature, its precise structure is unknown. Present evidence points to the dichloromethylene trithiocarbonate structure

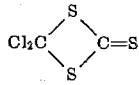

The preparation of the compound is given by M. Delepine et al., Bull. Soc. Chim. France (5), 2, 1969 (1935). It can also be made as follows:

A mixture of 115 g. of tetrachloro-1,3-dithietane, 77.5 ml. of thiolacetic acid, and 500 ml. of dry diethyl ether was stirred at 25° C. After 0.5 hour, 77.5 ml. of dry dimethylformamide was added and the resulting solution stirred at 25° C. for 17 hours. The solution gradually turned red-brown and a black, viscous layer separated. The ether layer was decanted, washed successively with cold water, dilute hydrochloric acid, and water, and then dried over anhydrous magnesium sulfate. Evaporation of the ether on the steam bath gave a viscous, liquid residue. This residue was dissolved in 300 ml. of carbon tetrachloride and the solution stirred at 25° C. while 25 ml. of bromine was added dropwise. The precipitated bromine adduct was filtered, washed with carbon tetrachloride, and dried in vacuo. The bromine adduct was covered with 200 ml. of acetone and the mixture heated to boiling in the presence of decolorizing charcoal. After filtration and cooling to —80° C., the crystals were filtered, redissolved in fresh acetone (200 ml.), and recrystallized by cooling to —80° C. Filtration under nitrogen, followed by brief drying with nitrogen and in air between pressed filters gave 48 g. of pure $C_2S_3Cl_2$ as bright yellow crystals melting at 53° to 54° C.

In one convenient preparation of the compounds of the invention a solution in absolute ethanol of the chlorocarbon sulfide, $C_2S_3Cl_2$, is placed in a reactor and cooled to 0° C. or lower. To the cooled solution there is then added with stirring a solution of an alkali metal trithiocarbonate (or alkali metal sulfide) and the mixture allowed to warm to ambient temperature. The product separates as a pale tan solid. This solid is collected, washed successively with hydrochloric acid, acetone, and carbon bisulfide, and then dried in vacuo.

Specific alkali metal sulfides and trithiocarbonates usefully employable are sodium, potassium, cesium, and rubidium sulfides and sodium and potassium trithiocarbonates. For reasons of economy, the sodium salts are generally preferred. No more than an equivalent amount of the alkali metal sulfide or trithiocarbonate is ordinarily used although there is nothing critical about the quantity or relative proportions.

The reaction between $C_2S_3Cl_2$ and alkali metal sulfide or alkali metal trithiocarbonate is generally carried out in the presence of a reaction medium, suitable media being methanol, ethanol, dimethylformamide, diethylformamide, ethylene glycol dimethyl ether, tetrahydrofuran, diethyl ether, and the like. There is nothing critical about the amount of reaction medium and it can equal or exceed by many fold the combined weights of the $C_2S_3Cl_2$ and inorganic sulfide.

The reaction between $C_2S_3Cl_2$ and the alkali metal sulfide or trithiocarbonate is generally conducted initially at temperatures of from —10° to 0° C. and completed at ambient temperature. Pressure is of no great importance in this reaction.

In a modification of the procedure just described, $C_2S_3Cl_2$ dissolved in a solvent, e.g., dimethylformamide, is cooled to 0° C., stirred, and to the stirred solution hydrogen sulfide is added continuously. After turbidity appears, the solution is allowed to warm to ambient temperature, while addition of hydrogen sulfide is continued. The pale tan solid which separates is collected and processed as previously described.

In this modification, the presence of a hydrogen chloride, or acid, acceptor is essential also. The dimethylformamide illustrated functions both as a solvent and an acid acceptor. Suitable acid acceptors in addition to dimethylformamide are dimethylacetamide, N-methyl pyrrolidone, and such unhindered trialkylamines, preferably tri (lower alkyl) amines, as triethyl- and tripropylamine and the like. Where liquid, they can also be used simultaneously as the solvent provided they are not so basic as to decompose the polymer. Alternatively, these acid acceptors can be employed with other reaction media such as those mentioned above.

The reaction between $C_2S_3Cl_2$ and hydrogen sulfide in the presence of a hydrogen chloride acceptor can be conducted at temperatures as low as —80° C. and up to +100° C. and under pressures which are in excess of atmospheric. The time of reaction in the initial step can vary from 15 minutes to one hour and in the final step, from 15 to 40 hours.

The structure of the instant polymer is not precisely known. Its composition as noted, however, is essentially carbon and sulfur in the mole ratio of about 1:2. The polymer can thus be regarded as polymeric carbon bisulfide. When prepared from a system capable of supplying hydroxyl groups, e.g., ethanol, a small quantity of hydrogen is also found on analysis. The assumption that the hydrogen present exists in end-capping or terminal groups provides a convenient method of determining molecular weights.

The examples which follow illustrate but do not limit the invention. In these examples, all pressures are ambient atmospheric unless otherwise specified.

*Example I*

A. A solution of 1.91 g. of $C_2S_3Cl_2$ in 20 ml. of dry dimethylformamide, under substantially anhydrous conditions, was stirred at 0° C. and hydrogen sulfide was then slowly bubbled into the solution. After the solution became turbid, i.e., in about 10 minutes, it was removed from the cooling bath and hydrogen sulfide was then bubbled in for about 2.5 additional hours. The polymer which formed was collected by filtration and washed by stirring successively for 0.5 hour with dilute hydrochloric acid, acetone, and carbon bisulfide. The washed product was dried in vacuo at 56° C. There was obtained 0.4 g. of a pale tan solid which melted at 195° to 200° C. The product analyzed 14.99% C and 81.10% S.

B. Improved yields of polymer were obtained by carrying out the reaction at lower temperatures and employing triethylamine as the hydrogen chloride acceptor:

A solution of 1.91 g. of $C_2S_3Cl_2$ in 50 ml. of ethylene glycol dimethyl ether was cooled to −80° C., and gaseous hydrogen sulfide was passed into the solution for 10 minutes. The resulting solution was then stirred and maintained at −80° C. while a solution of 1.0 g. of triethylamine in 10 ml. of ethylene glycol dimethyl ether was added in small portions. After the addition, the mixture was stirred for 5 minutes, then allowed to warm to room temperature. The products was collected by filtration, washed successively with 50-ml. portions of 10% hydrochloric acid, acetone and water, and dried. A yield of 1.31 g. of pale tan solid was obtained. This had a melting point of 185° to 198° C. and analyzed 14.84% C, 81.20% S, and 1.25% H. Self-supporting films can be formed by heating the polymer at 190° C. and 10,000 lbs./in.² pressure.

*Example II*

A 3-g. sample of anhydrous sodium sulfide, prepared as described subsequently, was added in small portions over a period of one hour to a vigorously stirred mixture of 8.4 g. of $C_2S_3Cl_2$ and 25 ml. of absolute ethanol, maintained at 0° C. The mixture was stirred for one hour longer at 0° C. and finally for 24 hours at ambient temperature. The product which separated was washed with ethanol, and stirred vigorously with water to remove water-soluble salts. The water-insoluble product was collected by filtration and treated successively with acetone and carbon bisulfide. The washed product was then dried in vacuo at 56° C. The dried product was a pale tan solid which weighed 0.6 g. It had a melting point of 200° to 205° C., analyzed 12.75% C, 84.34% S, and 1.15% H, and showed broad absorption bands in the infrared at 8.8μ, 9.45μ, and 14.0μ. On the basis of the hydrogen analysis it can be calculated that the polymer has a molecular weight corresponding to about 1500.

The anhydrous sodium sulfide used above was prepared by saturating a solution of sodium ethoxide in absolute ethanol with hydrogen sulfide, removing excess hydrogen sulfide by evacuation, and then adding slowly an equivalent solution of sodium ethoxide in absolute ethanol. The product was collected by filtration under a nitrogen blanket, washed several times with small portions of absolute ethanol, then with ether, and finally dried in vacuo.

*Example III*

A. A solution of 5.5 g. of sodium trithiocarbonate ($Na_2CS_3$) in 50 ml. of absolute ethanol was prepared from sodium ethoxide, hydrogen sulfide, and carbon disulfide according to the procedure of P. Silber and M. Murin, Compt. rend. 247, 602–4 (1958). This solution was added dropwise over a period of about 0.5 hour to a stirred mixture of 5.73 g. of $C_2S_3Cl_2$ and 50 ml. of absolute ethanol, maintained at 0° C. After completion of the addition, the reaction mixture was allowed to attain ambient temperature and stirred one hour at ambient temperature. The mixture was filtered and the solid product sequentially washed with ethanol and stirred with a large amount of water to remove water-soluble salts. The insoluble product was collected by filtration, and purified by stirring successively with large volumes of acetone and carbon bisulfide. After drying in vacuo at 56° C., the colorless solid obtained weighed 1.3 g. and melted at about 200° C. It analyzed 13.52% C, 1.52% H, and 81.89% S, and showed strong absorption bands in the infrared at 8.8μ, 9.45μ, and 14.0μ. On the basis of the hydrogen analysis it can be calculated that the polymer has a molecular weight of about 900.

Clear self-supporting films were pressed from the polymer at 135° C. and 8,000 lbs./in.² pressure. The films underwent no change on standing in air at ambient temperature for a year and were useful as wrapping and protective foils.

B. Essentially the same product was obtained when the sodium trithiocarbonate was first isolated (anal. C, 7.88; H, 0.55) and used subsequently in the reaction.

The polymers produced in accord with this invention are converted to self-supporting films by pressing at 135° to 190° C. and 8000 lbs./sq. in. to 10,000 lbs./sq. in. pressure and the films obtained are useful as protective foils which are impermeable to water.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises reacting, at a temperature in the range −80° to 100° C., $C_2S_3Cl_2$ with a member of the group consisting of (1) an alkali metal sulfide, (2) an alkali metal trithiocarbonate, and (3) a combination of hydrogen sulfide and a hydrogen chloride acceptor selected from the group consisting of dimethylformamide, dimethylacetamide, N-methyl pyrrolidone and unhindered tri-(lower alkyl) amines.

2. A solid polymer of carbon and sulfur prepared by the process of claim 1.

3. A polymer of claim 2 in the form of a self-supporting film.

4. The process which comprises reacting, at a temperature in the range −80° to 100° C., $C_2S_3Cl_2$ and hydrogen sulfide in the presence of dimethylformamide.

5. The process which comprises reacting, at a temperature in the range −80° to 100° C., $C_2S_3Cl_2$ and hydrogen sulfide in the presence of triethylamine.

6. The process of claim 5 accomplished in an inert organic reaction medium.

7. The process of claim 6 in which the inert organic reaction medium is ethylene glycol dimethyl ether.

8. The process which comprises reacting, at a temperature in the range −10° C. to ambient temperature, $C_2S_3Cl_2$ and sodium sulfide.

9. The process of claim 8 accomplished in an alkanol.

10. The process which comprises reacting, at a temperature in the range −10° C. to ambient temperature, $C_2S_3Cl_2$ and sodium trithiocarbonate.

11. The process of claim 10 accomplished in an alkanol.

(References on following page)

References Cited by the Examiner

UNITED STATES PATENTS

| | | | |
|---|---|---|---|
| 555,796 | 3/1896 | Whitehead | 23—14 |
| 2,113,353 | 4/1938 | McKenna | 23—14 |
| 2,113,354 | 4/1938 | McKenna | 23—14 |
| 2,849,275 | 8/1958 | Bleecker | 23—14 |
| 2,983,661 | 5/1961 | Lauer | 204—156 |

OTHER REFERENCES

Mellor: "Comprehensive Treatise on Inorganic and Themetical Chemistry," 1925, vol. VI, page 107.

P. W. Bridgman: Vol. 74, Proc. of Am. Acad. of Arts & Sci., page 413, 1942.

E. Whalley: Canadian Journal of Chem., vol. 38, pages 2105–2108, November 1960.

Wall et al.: Proc. of the Int. Symp. on Radiation-Induced Polymerization and Graft Copolymerization, U.S. Atomic Energy Comm., pages 107–108, December 1962.

Williard et al.: Instrumental Methods of Analysis, Third Edition, chapter 6, published by D. Van Nostrand Co. Inc., Princeton, N.J., January 1958.

LEON J. BERCOVITZ, *Primary Examiner.*

MAURICE A. BRINDISI, *Examiner.*